United States Patent
Lee

(10) Patent No.: US 8,619,285 B2
(45) Date of Patent: Dec. 31, 2013

(54) IMAGE FORMING APPARATUS, CLIENT, IMAGE FORMING SYSTEM AND CONTROL METHOD IN IMAGE FORMING SYSTEM

(75) Inventor: Ki-Moon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 556 days.

(21) Appl. No.: 12/493,381

(22) Filed: Jun. 29, 2009

(65) Prior Publication Data

US 2010/0046027 A1 Feb. 25, 2010

(30) Foreign Application Priority Data

Aug. 22, 2008 (KR) .................... 2008-82493

(51) Int. Cl.
*G06F 3/12* (2006.01)
*G06K 1/00* (2006.01)

(52) U.S. Cl.
USPC .................... 358/1.15; 358/1.9; 358/1.13

(58) Field of Classification Search
USPC ........................ 358/1.6, 1.13, 1.15
See application file for complete search history.

(56) References Cited

U.S. PATENT DOCUMENTS

| 6,678,068 B1* | 1/2004 | Richter et al. ............... 358/1.15 |
| 7,505,159 B2 | 3/2009 | Ohara |
| 2002/0004802 A1* | 1/2002 | Shima .......................... 707/513 |

FOREIGN PATENT DOCUMENTS

| JP | 3835322 | 8/2006 |
| KR | 10-2005-0116409 | 12/2005 |

OTHER PUBLICATIONS

Korean Decision of Rejection issued Aug. 29, 2013 for corresponding Korean Application No. 10-2008-0082493.

* cited by examiner

*Primary Examiner* — Thierry L Pham
(74) *Attorney, Agent, or Firm* — Staas & Halsey LLP

(57) ABSTRACT

An image forming apparatus, a client, an image forming system and a control method in the image forming system, the system including: an image forming apparatus and a client connected to the image forming apparatus. The image forming apparatus includes an embedded web server storing data on a plurality of executing windows respectively corresponding to a plurality of display items of the image forming apparatus. The client includes a display unit and a selection unit to select at least one display item to be displayed from among the plurality of items provided by the image forming apparatus. Accordingly, the client displays, through the display unit, the executing window based on data on an executing window corresponding to the display item of the web server.

22 Claims, 10 Drawing Sheets

FIG. 2B

Life Information — 460

Toner Cartridge-Life Information
Status:Ready
Average Yield:200000 Standard Pages
Note:Declared yiled value in accordance with ISO/IEC 19752
82% Remaining
Drum Cartridge-Life Information
Status:Ready
Yield:600000 Page(s)
95% Remaining
Note:Dependent on user job mode run length

Firmware Version — 450

Main Firmware Version:1.03.00.23W2 07-20-2007
Network Firmware Version:V2.03.01(SCX-6345N)HQ_wipro
Network Firmware Boot Version:V0.90(NPC3HPf:4M)
Engine Firmware Version:3.00.26
UI Firmware Version:JF_PL_V1.01.00.59 03-28-2008
Finisher Firmware Version:Not Installed
PCL 5E Firmware Version:PCL 5e 5.53 03-08-2007
PCL XL Firmware Version:PCL6 5.44 02-10-2007
PostScript Firmware Version:PS3 V1.53.66 12-03-2006
PDF Firmware Version:PDF V1.00.38 10-02-2006
DADF Firmware Version:1.02
Tray 2 Firmware Version:0.09.05

400

Others — 440

Tray 2:Installed
Tray 3:Not Installed
Tray 4:Not Installed
Scan To E-mail:Installed
Scan To FTP:Installed
Scan To SMB:Installed
Fax:Installed
PostScript:Installed
Extended Memory:Installed
DADF:Installed
Network Scan:Installed //IMAGE FORMING APPARATUS, CLIENT, IMAGE FORMING SYSTEM AND CONTROL METHOD IN IMAGE FORMING SYSTEM

CROSS-REFERENCE TO RELATED APPLICATION

This application claims the benefit of Korean Application No. 2008-82493, filed Aug. 22, 2008 in the Korean Intellectual Property Office, the disclosure of which is incorporated herein by reference.

BACKGROUND OF THE INVENTION

1. Field of the Invention

Aspects of the present invention relate to an image forming apparatus, and more particularly, to an image forming apparatus having an embedded web server to provide a personalized Graphic User Interface (GUI), a client connectable to the image forming apparatus, an image forming system including the image forming apparatus and the client, and a control method of the image forming system.

2. Description of the Related Art

Hereinafter, an image forming apparatus includes a scanner, printer, copier and multifunctional device to form an image on a print medium (such as paper, transparency, etc.) and/or to read an image from a document. A network printer is a type of an image forming apparatus that has a network connection operation in which a plurality of clients can be connected to the network printer through the Internet.

The network printer may have an embedded web server (EWS), through which each client can connect to the network printer through a web browser installed in each client without a private program for use with the network printer. However, the EWS provides a uniform and monotonous user interface (UI) without consideration of a client user. In order to provide a unique UI, an additional web server is built in the client (such as a workstation or a personal computer), which results in a significant burden for the building and management of the additional web server.

SUMMARY OF THE INVENTION

Aspects of the present invention provide an image forming apparatus having an embedded web server to provide a personalized GUI, a client connectable to the image forming apparatus, an image forming system including the image forming apparatus and the client, and a control method in the image forming system. Aspects of the present invention also provide an image forming apparatus having an embedded web server to provide a customized GUI to a client without an additional web server, a client connectable to the image forming apparatus, an image forming system including the image forming apparatus and the client, and a control method in the image forming system.

According to an aspect of the present invention, there is provided a control method of an image forming system including an image forming apparatus having an embedded web server and a client, the method including: connecting the client to the image forming apparatus by a user of the client; selecting a display item to be displayed on the client from among a plurality of display items provided by the image forming apparatus; and displaying, on the client, an executing window corresponding to the selected display item from among a plurality of executing windows respectively corresponding to the plurality of display items and stored in the web server.

The display item may be automatically selected according to a default setting.

The method may further include storing list information on the executing window corresponding to the selected display item in the client, the image forming apparatus, and/or a server that is distinct from the client and the image forming apparatus.

The list information may be provided for each user.

The method may further include: confirming the user; and updating the list information to include information on another executing window corresponding to another display item in response to the user selecting the other display item.

The displaying of the executing window may include: requesting and receiving, by the client, information on the executing window corresponding to the selected display item and firmware information of the image forming apparatus; generating the executing window based on the information on the executing window and the firmware information; and displaying the generated executing window.

The method may further include, in response to a request to change information on the image forming apparatus through the executing window, changing firmware of the image forming apparatus according to the request.

The plurality of executing windows corresponding to the plurality of display items may be displayed in the executing window.

The plurality of display items may be selected for one image forming apparatus in the display item, and the plurality of executing windows corresponding to the plurality of display items may be displayed on the client.

The displaying of the executing window may include, in response to a change of information on the selected display item, changing the displayed executing window according to the changed information.

The executing window may be independently operable.

According to another aspect of the present invention, there is provided an image forming apparatus connected to a client, the image forming apparatus including: a communication unit to communicate data with the client; and a web server including: a storage unit to store data on a plurality of executing windows respectively corresponding to a plurality of display items of the image forming apparatus, and a web server controller to control, in response to a request by a user for a display item to be displayed on the client from among the plurality of display items through the communication unit, the communication unit to transmit data on an executing window corresponding to the requested display item to the client.

The storage unit may store list information on the executing window corresponding to the requested display item.

The web server may update, in response to a change to the requested display item, the list information according to the changed display item.

The web server controller may authorize the user, and control the communication unit to transmit the list information corresponding to the authorized user to the client.

The apparatus may further include an information changing unit to change information on the image forming apparatus, wherein the web server controller may control, in response to a request to change the information on the image forming apparatus through the communication unit, the information changing unit to change the information on the image forming apparatus according to the request.

According to another aspect of the present invention, there is provided a client connected to an image forming apparatus having an embedded web server, the client including: a network connection unit connected to the image forming apparatus having the embedded web server; a selection unit to select a display item from among a plurality of items provided by the image forming apparatus; and a client controller to control the network connection unit to receive data on an executing window corresponding to the selected display item, and to control a display unit to display the received executing window.

The client controller may control the selection unit to select the display item according to preset information.

The client controller may control the display unit to display a plurality of executing windows corresponding to a plurality of display items of the image forming apparatuses.

According to yet another aspect of the present invention, there is provided an image forming system including: an image forming apparatus; a client connected to the image forming apparatus, the image forming apparatus including an embedded web server to store data on a plurality of executing windows respectively corresponding to a plurality of display items of the image forming apparatus, and the client including a selection unit to select a display item to be displayed from among the plurality of items provided by the image forming apparatus, and displaying, through a display unit, the executing window based on data on an executing window corresponding to the selected display item of the web server.

According to still another aspect of the present invention, there is provided a database server of a network including a client and an image forming apparatus, the client receiving, from the image forming apparatus, an executing window corresponding to a selected display item for the image forming apparatus in order to display the executing window, the database server including: a storage unit to store list information including information used to execute the executing window corresponding to the selected display item; and a transmission unit to transmit the stored list information to the client.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 2A and 2B illustrate widgets corresponding to a plurality of items of an image forming apparatus included in the image forming system in FIG. 1;

DETAILED DESCRIPTION OF THE EMBODIMENTS

Figure 1:
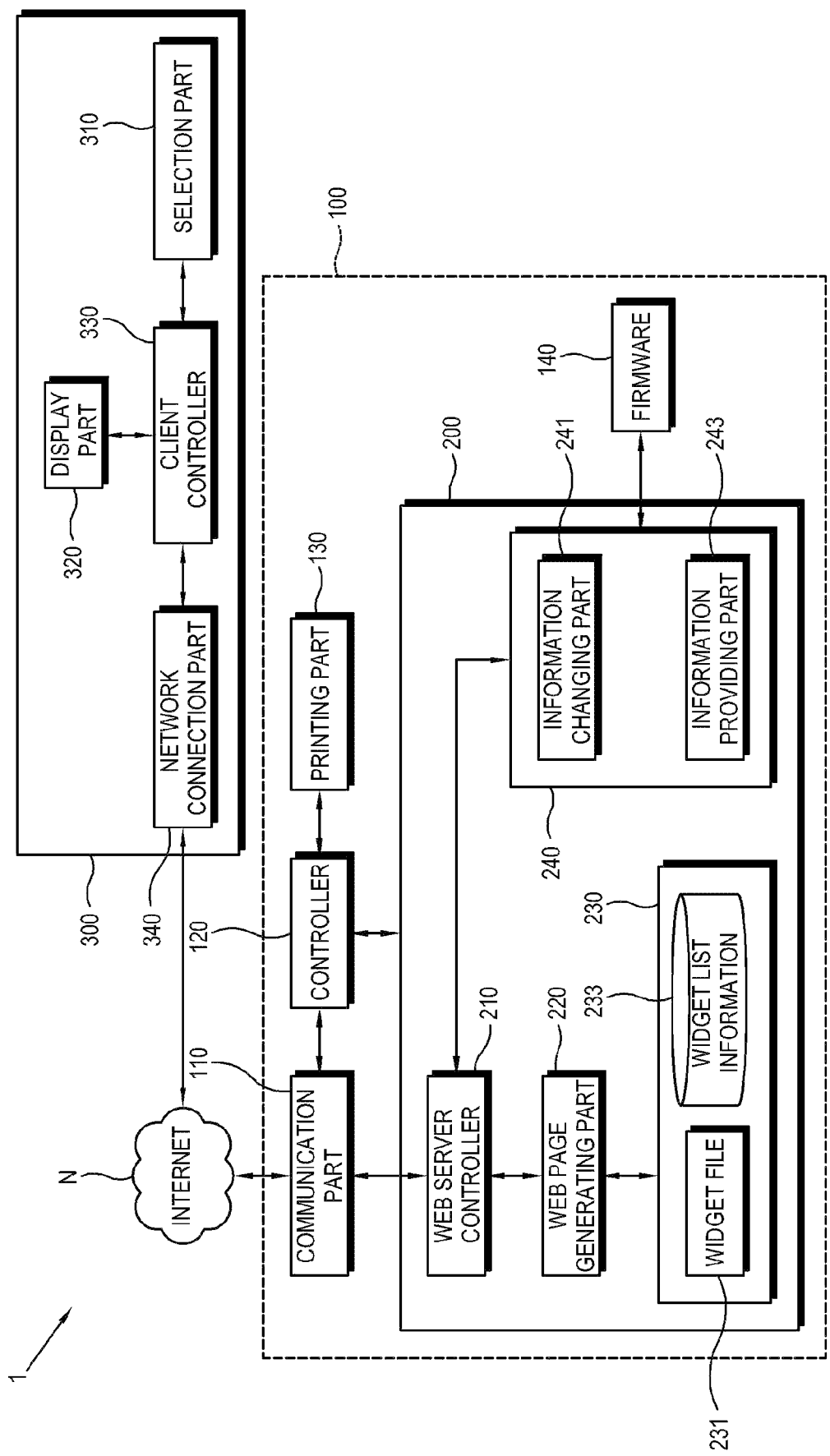
FIG. 1 is a schematic block diagram illustrating an image forming system according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a schematic block diagram illustrating an image forming system according to an embodiment of the present invention. Referring to FIG. 1, the image forming system 1 includes a client 300, and an image forming apparatus 100 connected to the client 300 through a network (for example, the Internet N).

The client 300 includes a display part 320, a network connection part 340 connected to the Internet N (which is provided as a non-limiting example of a network), a selection part 310 to select an item to be displayed on the display part 320 (i.e., a display item among a plurality of items of the image forming apparatus 100), and a client controller 330. The selection part 310 may include at least one input unit (for example, a keyboard, a mouse, a rotatable dial, input buttons, etc.) and/or may be integrated with the display part 320 as a touch screen. Furthermore, an item of the image forming apparatus 100 refers to an individual unit of information about the image forming apparatus 100, which is set up to be provided to the client 300. For example, the plurality of items may include information about a tray on which various types of print media can be placed, information about firmware 140 of the image forming apparatus 100, and/or information about the remaining amount of ink or toner that is used as a developer of the image forming apparatus 100.

The client controller 330 controls the network connection part 340 to request, from the image forming apparatus 100, data on a widget for a display item (i.e., data on an executing window) and to receive the data on the executing window from the image forming apparatus 100, in response to the display item being selected through the selection part 310. Then, the client controller 330 displays the received execution window through the display part 320.

The image forming apparatus 100 includes a communication part 110 to communicate with the client 300, and a web server 200. The web server 200 includes a storage part 230 to store data on the plurality of executing windows corresponding to the plurality of items of the image forming apparatus 100, and a web server controller 210. If a request for an executing window for a display item among the plurality of items is received through the communication part 110, the web server controller 210 controls the communication part 110 to transmit, to the client 300, data used to generate the executing window. The web server 200 further includes a web page generating part 220 to generate a web page displayable through a web browser of the client 300. Specifically, the web page includes the requested display item (or display items, if more than one display item is requested) from among the plurality of items. In this respect, the data used to generate the executing window includes data on the web page used to display the executing window.

Hereinafter, a process of displaying the executing window for the display item will be described in more detail. If the client 300 requests, from the image forming apparatus 100, the executing window for the display item from among the plurality of items, the web server controller 210 controls the web page generating part 220 to generate the web page including the executing window for the display item. Then, the web server controller 210 controls the communication part 110 to transmit the generated web page to the client 300. In this respect, the web page may be written in HTML and/or JavaScript for operation in a web browser, or may be written in other script languages.

The client controller 330 executes the web browser to display the web page through the display part 320 in response to the web page being received through the network connection part 340. Accordingly, the client 300 can obtain desired information to display regarding the image forming apparatus 100. That is, a customized GUI can be provided to the client 300.

The storage part 230 may store therein a widget file 231 including widget codes to generate a plurality of widgets respectively corresponding to the plurality of items, and widget list information 233 including information used to execute a widget corresponding to the display item. The widget file 231 may be stored in the format of a plurality of files respectively corresponding to the plurality of widgets.

It is understood that the widget is only an example of an executing window to respectively display the plurality of items of the image forming apparatus 100. That is, any gadget or file operable as an independent application program like a widget can be realized as the executing window. That is, the executing window may be realized by the widget and/or the gadget. In this respect, data on the executing window may include at least one of the widget file 231 and a gadget file to generate the gadget. Furthermore, the widget may be realized as a web widget that can be installed and executed in an HTML-based web page, or may be displayed on a desktop (for example, wallpaper) of the client 300. In the latter case, an additional widget engine may be installed in the client 300. If the client 300 is connected to the image forming apparatus 100, a user may be given an option on whether to install the widget engine stored in the storage part 230 in the client 300. The widget engine may be installed in the client 300 according to a user selection. Alternatively, the widget engine may be installed in the client 300 without providing the user with an option.

The widget list information 233 may include titles of the plurality of widgets, a title of the widget file stored in the storage part 230, coordinates of the widget on the web page generated by the web page generating part 220, a storage location (storage path) of the widget file, and/or the like. Alternatively, the widget list information 233 may include a title of the widget corresponding to the display item selected through the selection part 310 of the client 300, the title of the widget file, the coordinates, and/or the storage position. Moreover, the widget list information 233 may be stored in the client 300. In this case, if the display item is changed through the selection part 310, the client controller 330 may update the widget list information 233 to include information used to execute a widget corresponding to the changed display item.

The term "widget" refers to a small GUI tool that displays execution of an application program operating on an operating system in a system such as a computer. For example, a web widget is executed in an HTML-based web page, and can be added or deleted in the web page.

Figure 2A:
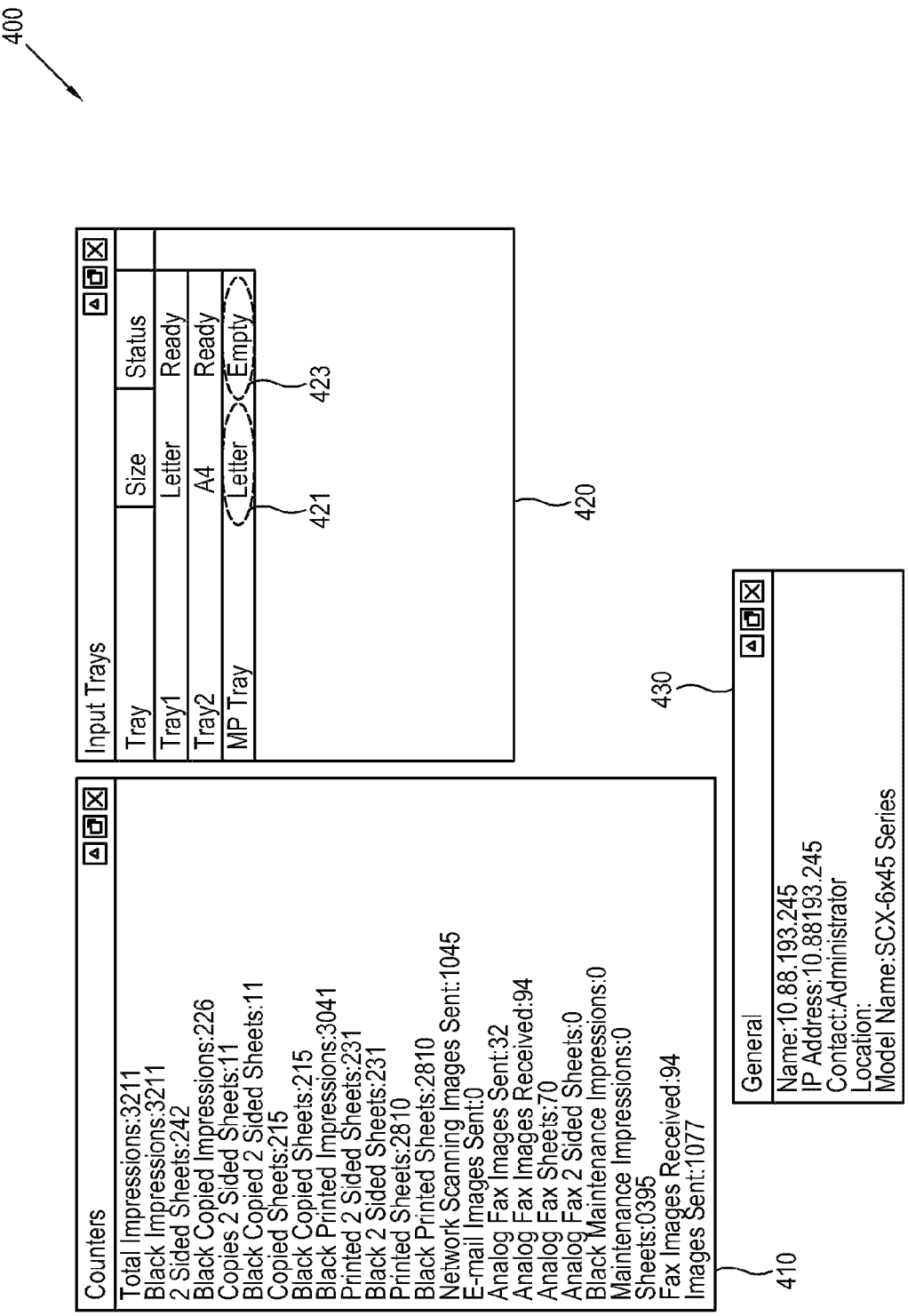

Examples of widgets corresponding to the items of the image forming apparatus 100 are shown in FIGS. 2A and 2B. Referring to FIG. 2A, a first widget 410 is a count item widget to count a number of operations performed in the image forming apparatus 100 (for example, the number of total printing operations, duplex printing operations and image transmitting and/or receiving operations). A second widget 420 is a tray item widget to display information on the presence or absence of a print medium in a supply tray of the image forming apparatus 100 and the type of the print medium. A third widget 430 is a general item widget to display information on a name, IP address (for example, 10.88.193.245), location and model name of the image forming apparatus 100.

Referring to FIG. 2B, a fourth widget 440 is an extra item widget to display information on installation of the supply tray, support of the operations of scan to e-mail, scan to File Transfer Protocol (FTP) and scan to Server Message Block (SMB) to transmit an image file scanned in the image forming apparatus 100 by e-mail, FTP, and SMB, support of a facsimile and PostScript, installation of an extended memory, installation of a Duplex-Automatic Document Feeder (DADF), support of network scan, or the like. A fifth widget 450 is a firmware item widget to display information on a firmware version. A sixth widget 460 is a cartridge life item widget to display information on a toner cartridge life if a toner is used as a developer. The widgets 410-460 are each provided to display a portion of the plurality of items of the image forming apparatus 100, which may vary according to other embodiments of the present invention.

Hereinafter, the widgets 410-460 illustrated in FIGS. 2A and 2B are provided as an example of a display item GUI. First, it is determined whether the client 300 is connected to the image forming apparatus 100. For example, if an IP address of the image forming apparatus 100 is inputted through an address window of a web browser of the client 300, it is determined that the client 300 requests, from the image forming apparatus 100, information on the image forming apparatus 100. Accordingly, the web server controller 210 of the image forming apparatus 100 enables the web page generating part 220 to generate a web page and provides the generated web page to the client 300 through, for example, hypertext transfer protocol (HTTP).

The client 300 receives the web page and requests, from the image forming apparatus 100, the widget list information 233. However, it is understood that aspects of the present invention are not limited thereto. For example, according to other aspects, the widget list information 233 is stored in the client 300 and the client 300 reads the widget list information 233 stored therein without requesting the widget list information 233 from the image forming apparatus 100. Then, the client 300 requests, from the image forming apparatus 100, the widget file 231 to generate a widget included in the widget list information 233, and downloads or receives the widget file 233. Accordingly, the widget file 231 is executed on the web page.

Further, the client controller 330 determines whether information on the firmware 140 of the image forming apparatus 100 is used to display a widget corresponding to the display item according to execution of the widget file 231. If it is determined that the firmware information is used, the client controller 330 requests, from the image forming apparatus 100, the firmware information. For example, in order to display the tray item widget 420, information about the type of the tray 421 and whether or not a print medium is loaded in the tray 423 is used. Thus, the client controller 330 requests, from the image forming apparatus 100, the information that is stored in the firmware 140 of the image forming apparatus 100.

If the client 300 requests the firmware information, the web server controller 210 of the image forming apparatus 100 controls an information supplying part 243 to read the corresponding information from the firmware 140 and controls the communication part 110 to transmit the read firmware information to the client 300. The firmware information is transmitted to the client 300 (for example, through HTTP) in a data string format (for example, XML, JSON, CVS, or the like) that can parse a widget executed in the client 300. In response to receiving the firmware information, the client controller 330 generates the widget.

If the widget list information 233 includes a plurality of widgets (i.e., if there is a plurality of display items), the processes from the widget file request to the widget generation may be sequentially performed for the respective widgets, or may be simultaneously performed in parallel. In the former case, after a widget for one display item is generated, a widget for another display item is generated. In the latter case, before generation of one widget user interface (UI) is completed, generation of another widget UI begins. The client controller 330 generates a final UI in which a widget finally generated in this way is arranged on the web page according to the widget list information 233. Then, the client controller 330 executes the web browser to display the final UI on the display part 320.

Figure 3:
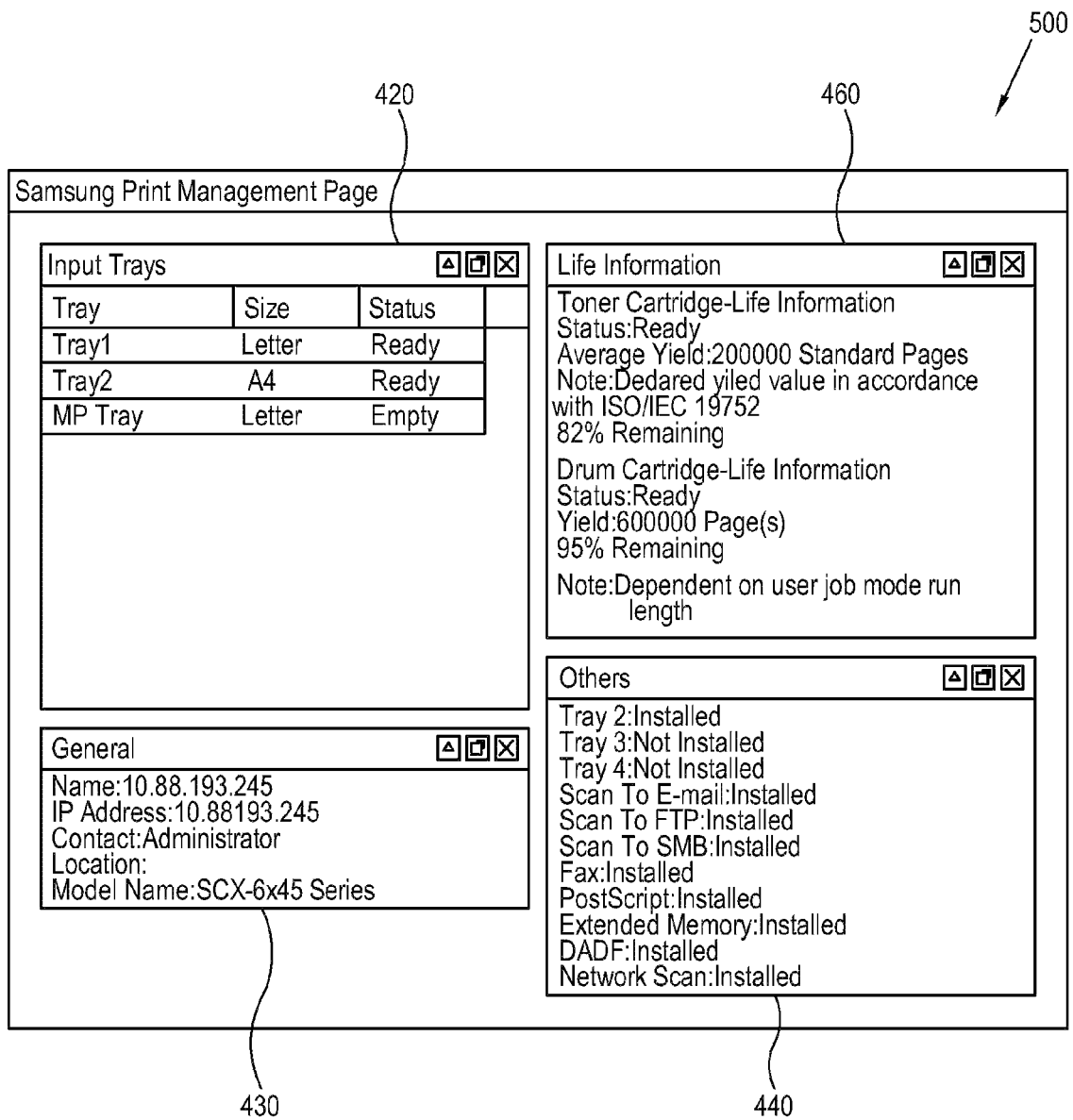
FIG. 3 illustrates a customized user interface displayed on a client included in the image forming system in FIG. 1.

FIG. 3 illustrates an example of a customized UI 500 displayed on the client 100. Referring to FIG. 3, if a user selects a tray item, general item, cartridge life item, and extra item as display items, a tray item widget 420, a general item widget 430, a cartridge life item widget 460, and an extra item widget 440 corresponding to the selected display items are displayed on the display part 320. That is, if a user displays the plurality of display items for one image forming apparatus 100, the plurality of widgets (that is, executing windows) are displayed corresponding thereto.

Further, if information about the image forming apparatus 100 such as a tray item widget 420 or a cartridge life item widget 460 changes (for example, if a tray runs out of a print medium or a remaining amount of a toner is below a reference value), the widgets 420 and 460 are updated corresponding thereto. To this end, the respective widgets 420 and 460 may periodically request, from the image forming apparatus 100, corresponding information (for example, every five or ten minutes), and receive the information to confirm a change in the information displayed in the respective widgets 420 and 460.

The web server controller 210 may confirm (i.e., authorize) a user of the client 300. To this end, the web server 210 may request input of an ID and/or a password and compare the inputted ID and/or password with a pre-stored user table. Alternatively (or additionally), the web server controller 210 may confirm the user of the client 300 from an IP address of the client 300 and a pre-stored IP address table. Moreover, the widget list information 233 may be provided for each user. In the case that a plurality of users have access to one client 300 (i.e., the user does not correspond to the client 303 one-to-one), user confirmation may be made through an ID and/or a password.

After the web server controller 210 confirms the user, if the widget list information 233 corresponding to the user is stored in the storage part 230, the web server controller 210 may transmit the widget list information 233 to the corresponding client 300. If the widget list information 233 corresponding to the user is not stored in the storage part 230, the web server controller 210 may transmit default widget list information to the corresponding client 300. Moreover, if it is determined that the user selects a display item other than a previously selected display item, the web server controller 210 updates the widget list information 233 according to the new display item.

The widget list information 233 may automatically change according to information about a user printing history, as well as the user selection. For example, if it is determined that a user views (or selects, requests, etc.) the tray item and the cartridge life item among the plurality of items of the image forming apparatus 100 over a predetermined time for a predetermined period of time, the widget list information 233 may automatically change so that information used to execute the tray item widget and the cartridge life item widget are included in the widget list information 233 based on the printing history.

The image forming apparatus 100 further includes a firmware information processing part 240 to read information from the firmware 140 or to change the information into demand information according to a demand of the client 300. The firmware information processing part 240 may further include an information providing part 243 to read information from the firmware 140, and an information changing part 241 to change information in the firmware 140. The demand to change the firmware information is made through the widgets 410-460. For example, if a demand to change an IP address is input through the general item widget 430, the web server controller 210 controls the information changing part 241 to change the firmware information (i.e., an IP address of the image forming apparatus 100 into a new IP address).

Figure 4:
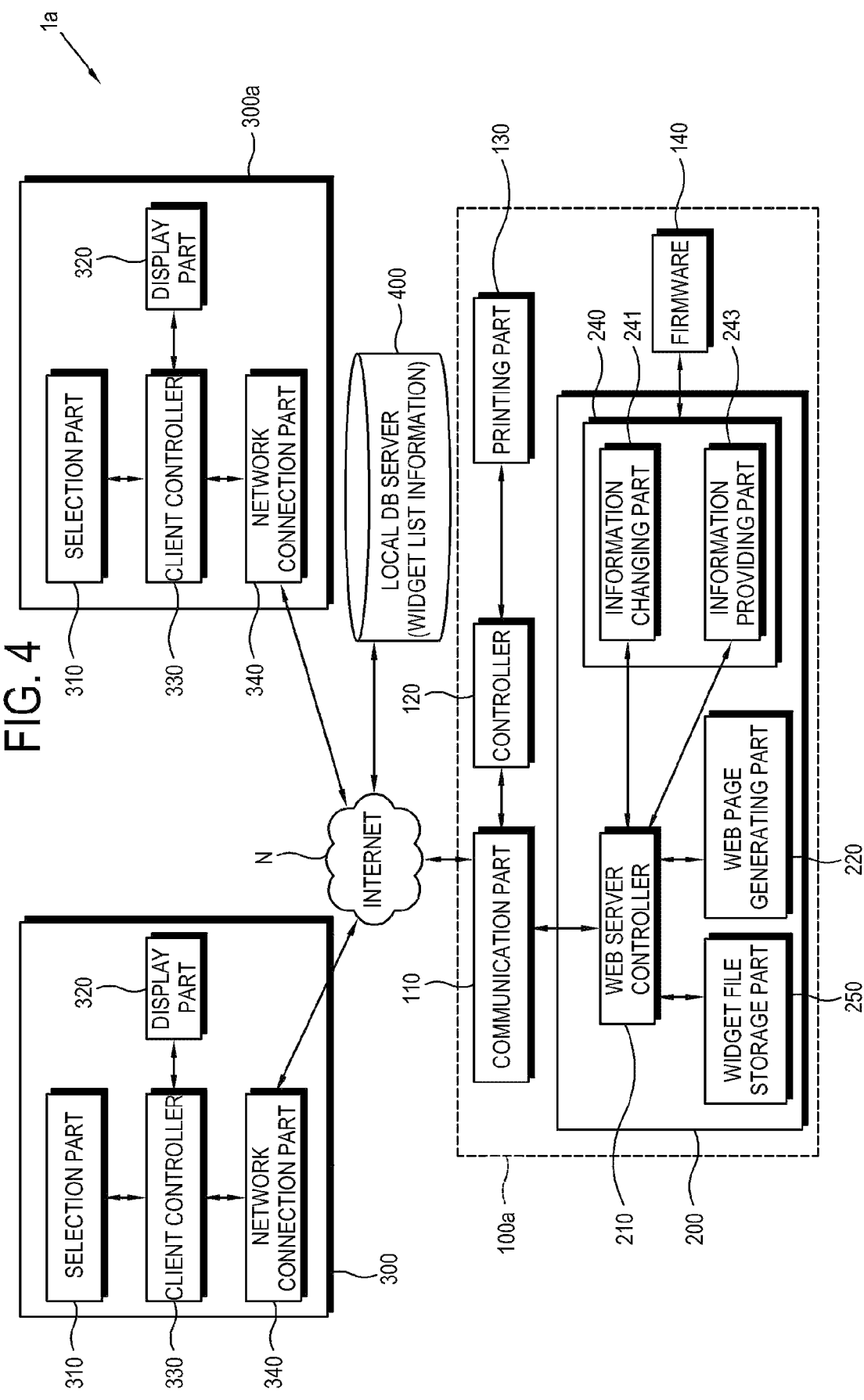
FIG. 4 is a schematic block diagram illustrating an image forming system according to another embodiment of the present invention.

FIG. 4 is a schematic block diagram illustrating an image forming system 1a according to another embodiment of the present invention. Referring to FIG. 4, the image forming system 1a includes a plurality of clients 300 and 300a, a local database (DB) server 400 in which widget list information as described is stored, and an image forming apparatus 100a. While the widget list information 233 is stored in the image forming apparatus 100 or the client 300 in the image forming system 1 according to the embodiment illustrated in FIG. 1, widget list information is stored in the local DB server 400 according to the present embodiment illustrated in FIG. 4. Thus, the image forming apparatus 100a includes a widget file storage part 250 in which a widget file is stored.

The clients 300 and 300a request from the local DB server 400, rather than the image forming apparatus 100a, the widget list information and receive the widget list information from the local DB server 400. Accordingly, the client 300 or 300a (specifically, a client controller 330) determines which display item is to be displayed on the clients 300 or 300a from the received widget list information, and requests, from the image forming apparatus 100a, a widget file to generate a widget corresponding to the display item. A web server controller 210 of the image forming apparatus 100a transmits a widget file corresponding to the display item from among the widget files stored in the widget file storage part 250 to the requesting client 300 or 300a. The process of generating the display item GUI is similar to that described above with reference to FIGS. 1-3.

Figure 5:
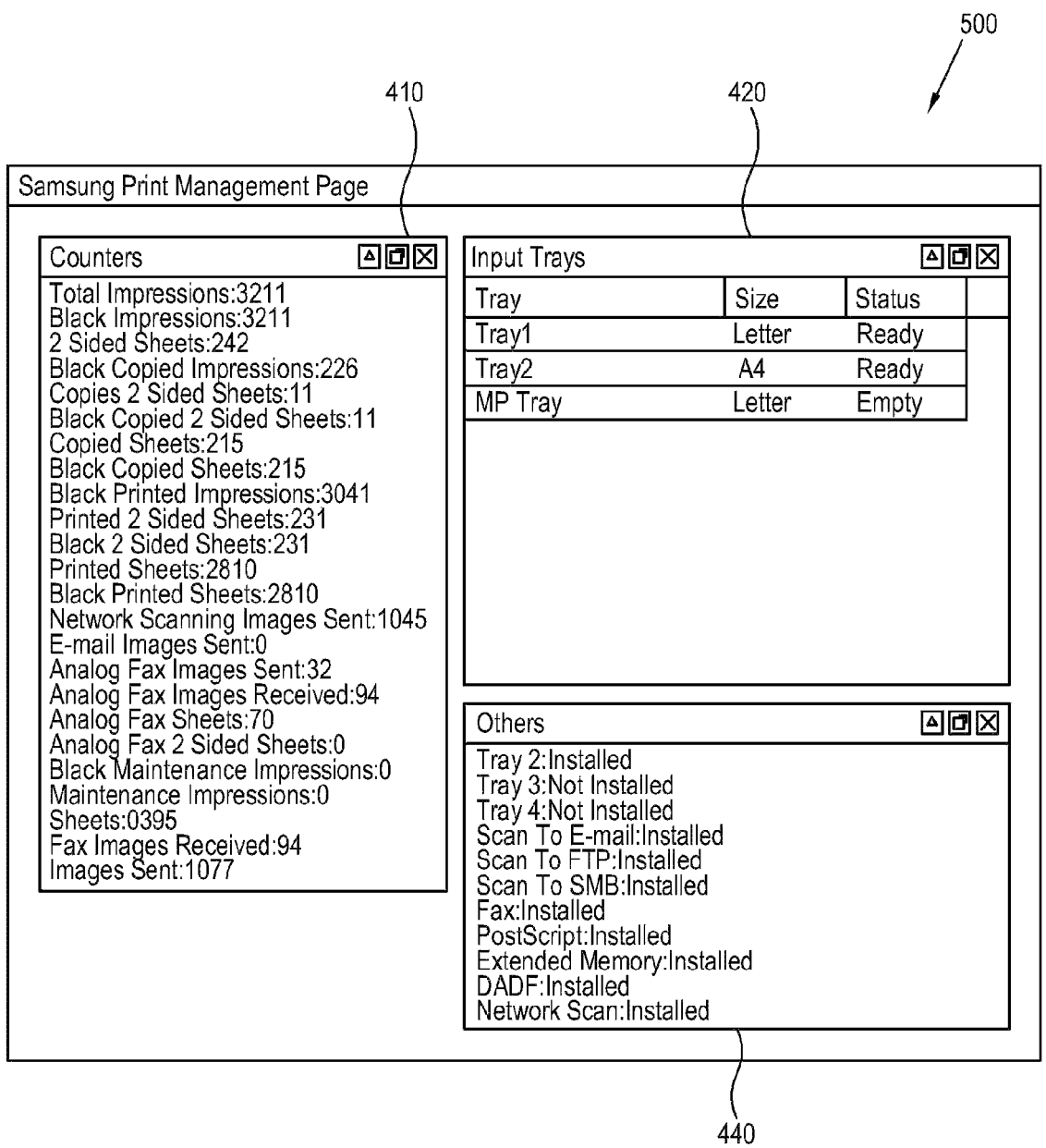
FIG. 5 illustrates a customized user interface displayed on a client included in the image forming system in FIG. 4.

FIG. 5 illustrates an example of a customized user interface displayed on a client included in the image forming system 1a in FIG. 4. Referring to FIG. 5, a display item GUI is displayed including a count item widget 410, a tray item widget 420 and an extra item widget 440. As can be seen in FIGS. 3 and 5, configurations of the widgets can differ. Even in the case of a same widget (such as the tray item widget 420), the locations thereof may differ. Hence, a customized GUI can be provided.

Figure 6:
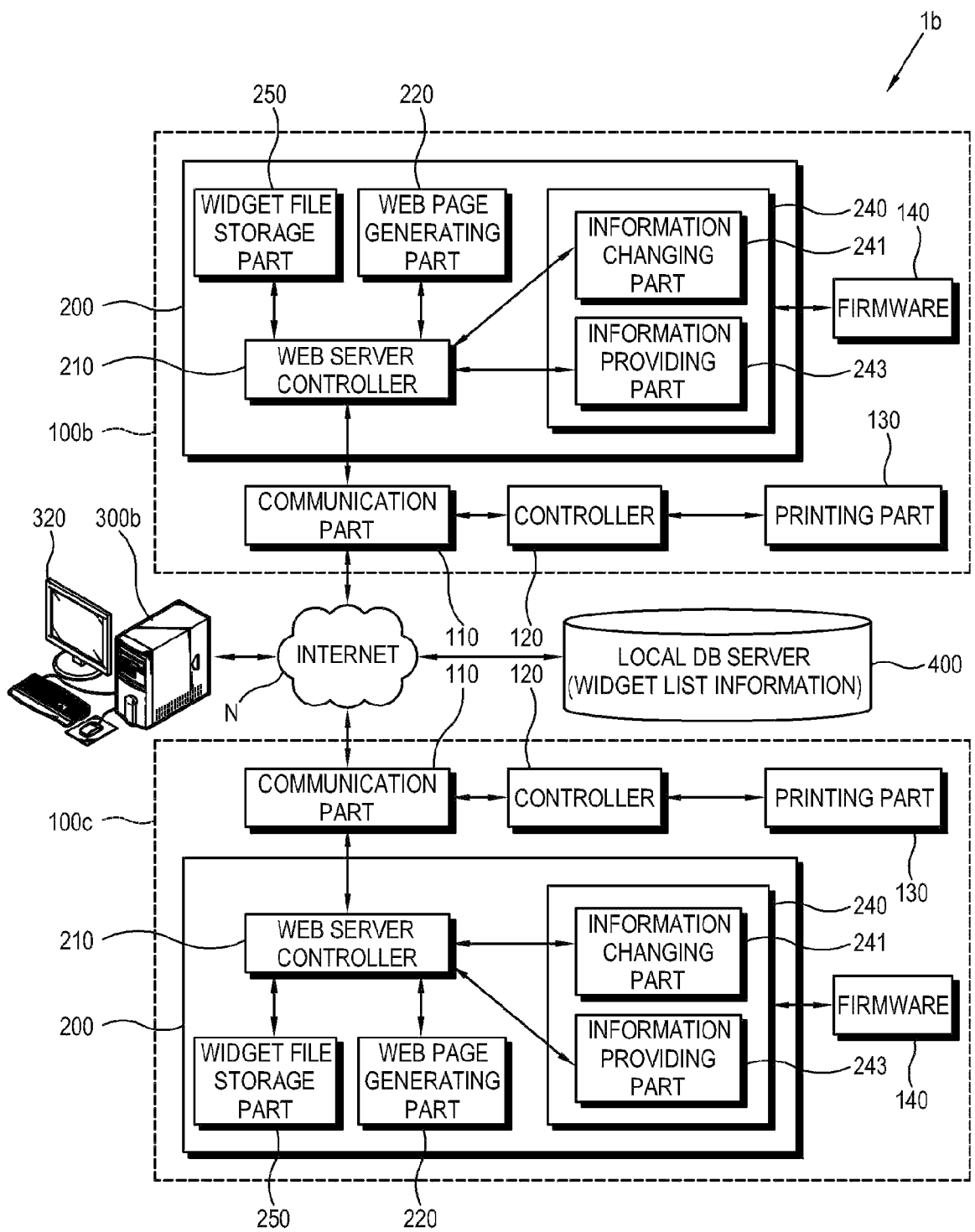
FIG. 6 is a schematic block diagram illustrating an image forming system according to still another embodiment of the present invention.

FIG. 6 is a schematic block diagram illustrating an image forming system 1b according to still another embodiment of the present invention. Referring to FIG. 6, the image forming system 1b includes a client 300b, a local DB server 400 in which widget list information as described above is stored, and a plurality of image forming apparatuses 100b and 100c.

The client 300b has the same configuration as that of the clients 300 and 300a described above. In the present embodiment, the client 300b is connected to the plurality of image forming apparatuses 100b and 100c. The plurality of image forming apparatuses 100b and 100c include a first image forming apparatus 100b and a second image forming apparatus 100b. Accordingly, a user of the client 300b may select a first display item from among a plurality of items of the first image forming apparatus 100b and/or may select a second display item from among a plurality of items of the second image forming apparatus 100c through the selection part 310.

The client 300b requests, from the local DB server 400, widget list information in which information used to execute widgets corresponding to the first and second display items is included, and then receives the widget list information from the local DB server 400. Further, the client 300b requests, from the first and second image forming apparatuses 100b and 100c, widget files corresponding to the first and second display items, and then receives the widget files. Also, if firmware information of the image forming apparatuses 100b and 100c is used to generate widgets corresponding to the widget files, the client 300b requests, from the image forming apparatuses 100b and 100c, the firmware information, and then receives the firmware information.

Figure 7:
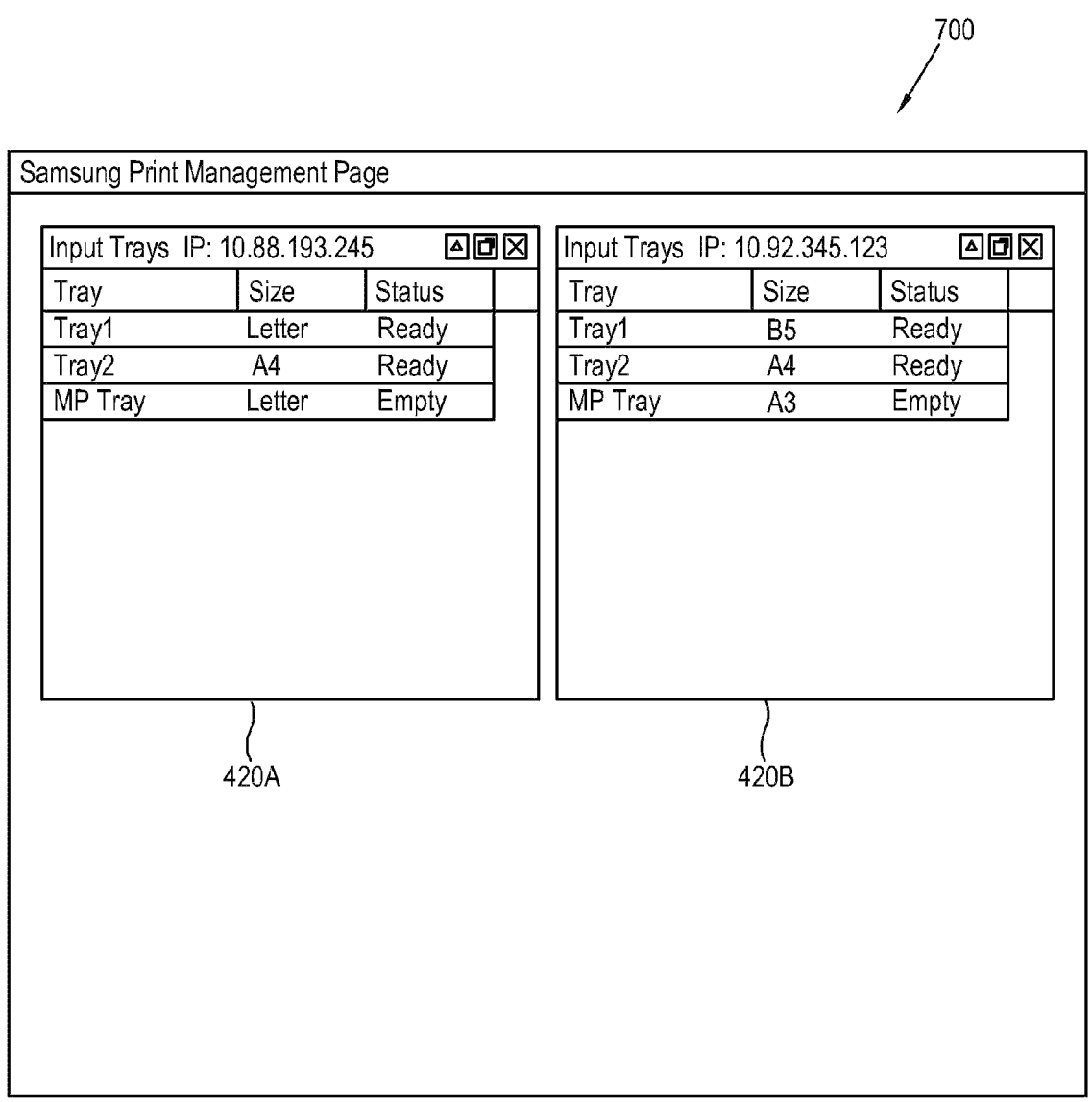
FIG. 7 illustrates a customized user interface displayed on a client included in the image forming system in FIG. 6.

A first widget and a second widget are generated corresponding to the first and second display items based on the received widget files, widget list information, and/or firmware information, and are displayed on a display part 320 of the client 300b. An example of a display item GUI in which the first and second widgets are displayed on one screen is shown in FIG. 7. Here, tray item widgets 420A and 420B for tray items of the first and second image forming apparatuses 100b and 100c, respectively, each having IP addresses 10.88.193.245 and 10.92.345.123 are displayed on one screen.

Thus, if a plurality of image forming apparatuses is provided on the network (for example, the Internet N), a desired item or items from among a plurality of items of each image forming apparatus can be displayed on one screen, to thereby provide a customized GUI and enhance user convenience.

Figure 8:
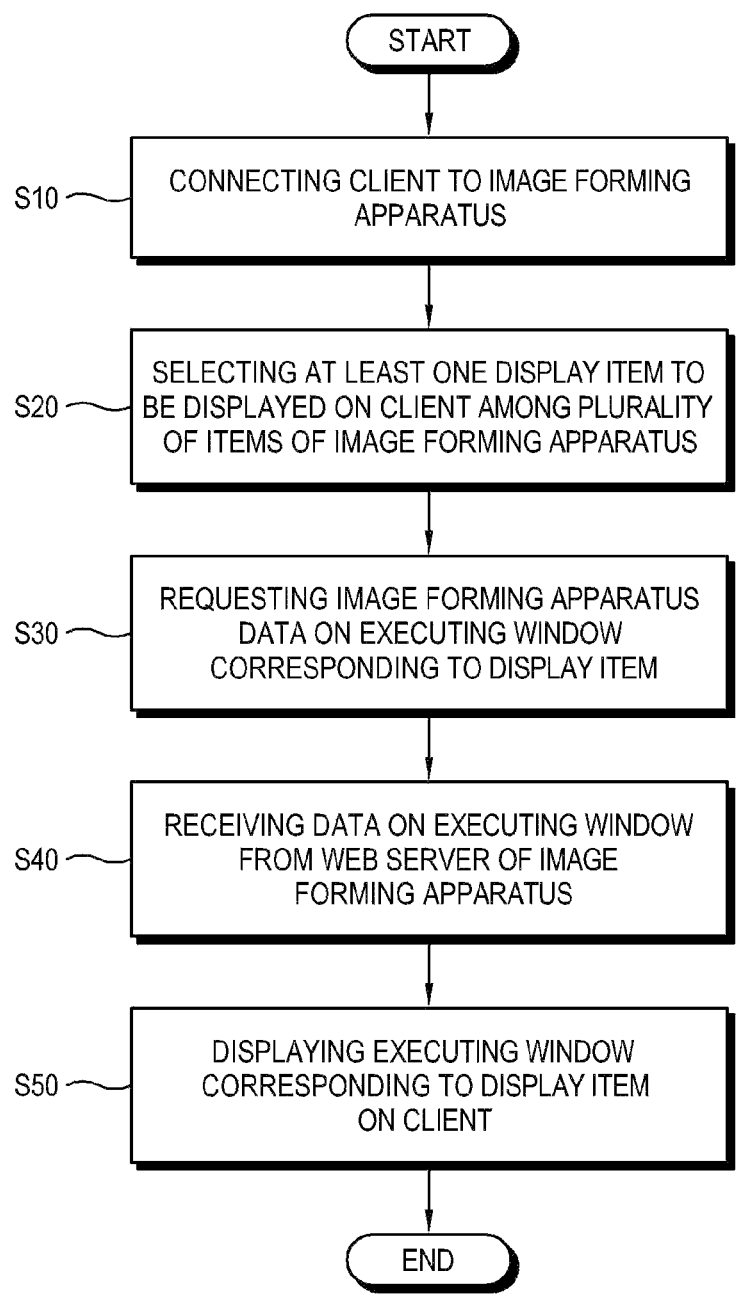
FIG. 8 is a flowchart illustrating a control method of an image forming system according to an embodiment of the present invention.

Hereinafter, a control method of an image forming system according to an embodiment of the present invention will be described with reference to FIGS. 1 and 8. Referring to FIGS. 1 and 8, the client 300 is connected to the image forming apparatus 100 in operation S10. Then, a display item to be displayed on the client 300 among a plurality of items of the image forming apparatus 100 is selected in operation S20. In this respect, if information on the display item is stored in the image forming apparatus 100, the client 300, and/or an additional local DB server 400 (as illustrated in FIG. 4), the display item may be indirectly selected. Alternatively, a UI (not shown) to select the display item may be provided so that a user of the client 300 can directly select the display item of the image forming apparatus 100.

Then, the client 300 requests, from the image forming apparatus 100, data on an executing window (such as a widget) corresponding to the display item in operation S30. For example, the web server 200 of the image forming apparatus 100 stores data to provide a plurality of executing windows respectively corresponding to the plurality of items of the image forming apparatus 100. The web server 200 transmits an executing window corresponding to the selected display item from among the plurality of stored executing windows to the client 300 in response to the request of the client 300 in operation S40. The received executing window corresponding to the selected display item is displayed on the client in operation S50. In this way, a user desired display item from among a plurality of items of the image forming apparatus 100 is displayed on the client 100, to thereby provide a customized UI.

Figure 9:
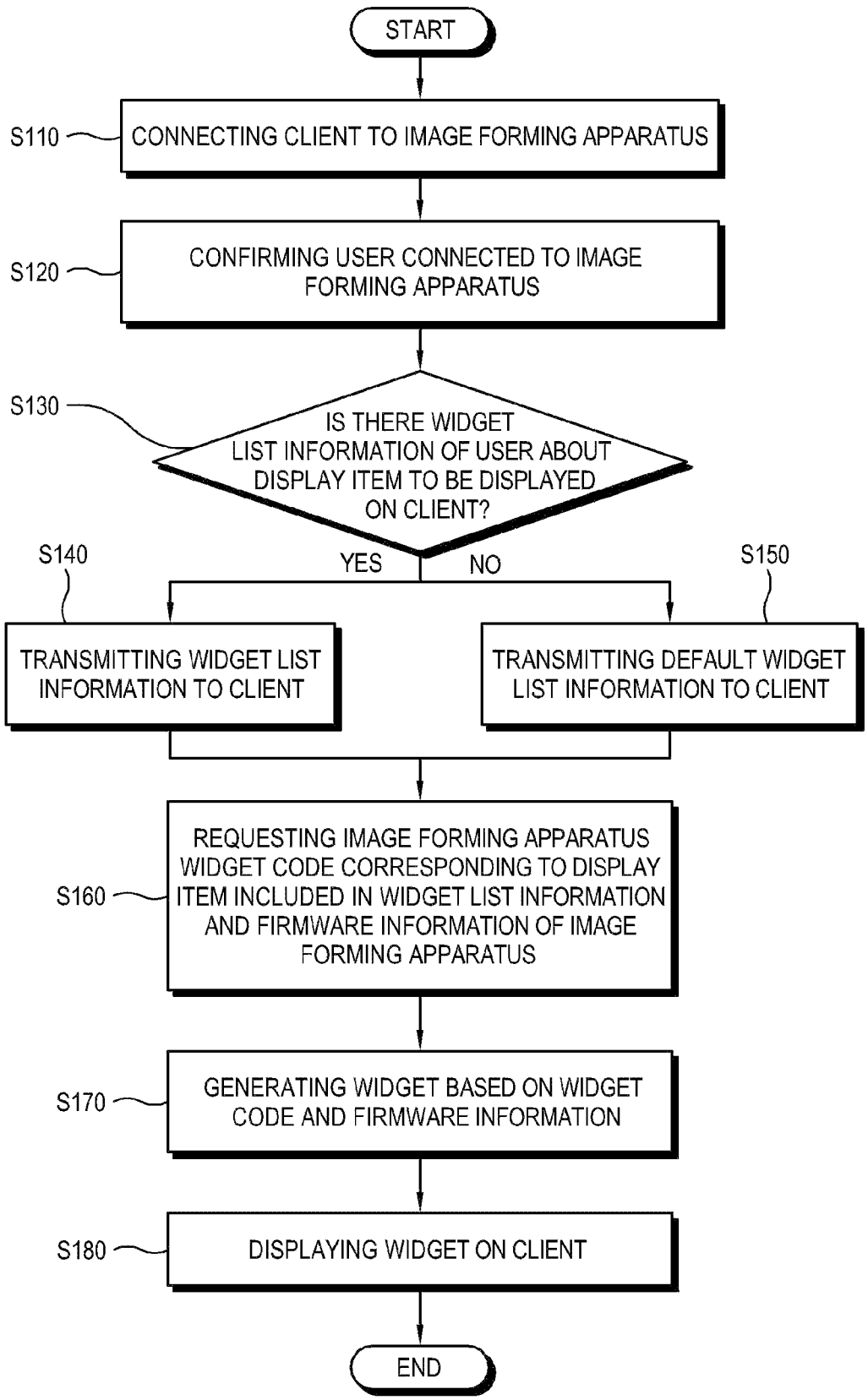
FIG. 9 is a flowchart illustrating a control method of an image forming system according to another embodiment of the present invention.

Hereinafter, a control method of an image forming system according to another embodiment of the present invention will be described with reference to FIGS. 1 and 9. Referring to FIGS. 1 and 9, the client 300 is connected to the image forming apparatus 100 in operation S110. The image forming apparatus 100 confirms a connected user in operation S120. Then, it is determined whether there exists widget list information for the user corresponding to a display item to be displayed on the client 300 from among a plurality of items of the image forming apparatus 100 in operation S130. In this respect, the widget list information includes information used to display a display item widget corresponding to the display item among a plurality of widgets respectively corresponding to the plurality of items on the client 300 (for example, a title of display item widget, a storage location of a code (file) of the display item, a storage location of firmware information used to display the display item widget as a UI, and/or coordinates on the display part 320 of the client 300 on which the display item widget UI is displayed, as described above). The widget list information may be changed according to a user input. However, it is understood that aspects of the present invention are not limited thereto. For example, according to other aspects, the widget list information may be automatically changed according to a user printing history. For example, the widget list information may be changed to include a display item that has been requested to be displayed over a predetermined time for a predetermined period of time by the user. Further, the widget list information may be stored in the client 300, the image forming apparatus 100, and/or the additional local DB server 400 (as illustrated in FIG. 4). In the case that the widget list information is stored in the client 300 or the image forming apparatus 100, an additional server is unnecessary, thereby reducing the cost to build and to manage the server.

If it is determined that the widget list information does exist (operation S130), the widget list information is transmitted to the client 300 in operation S140. Conversely, if it is determined that the widget list information does not exist (operation S130), default widget list information is transmitted to the client in operation S150. In this respect, the default widget list information includes information on an item arbitrarily selected from among the plurality of items as a display item. The default list information may include information on all of the plurality of items. It is understood that, if the widget list information is originally stored in the client 300, operations S140 and S150 may be omitted.

The client 300 requests, from the image forming apparatus 100, a widget file corresponding to the display item included in the widget list information and firmware information of the image forming apparatus 100 used to generate a widget (or executing window) corresponding to the display item in operation S160. In this respect, the widget file is stored in the web server 200 of the image forming apparatus 100. Then, the client 300 receives the widget file and the firmware information corresponding to the display item, and generates a widget based on the widget file and the firmware information in operation S170.

The generated widget is displayed through the display part 320 of the client 300 in operation S180. Accordingly, if a user wants to change information on the image forming apparatus 100 (for example, firmware information) through the widget displayed on the display part 320, the web server 200 of the image forming apparatus 100 enables the information changing part 241 to change the firmware information 140 in response to a user input.

Furthermore, if a plurality of display items is selected or requested by a user, a plurality of widgets corresponding to the plurality of display items may be sequentially generated or may be simultaneously generated in parallel. By arranging the plurality of widgets in corresponding locations according to the widget list information, a final display item GUI is displayed on the display part 320.

While not restricted thereto, aspects of the present invention can also be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Aspects of the present invention may also be realized as a data signal embodied in a carrier wave and comprising a program readable by a computer and transmittable over the Internet.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A control method of an image forming system comprising an image forming apparatus having an embedded web server and a client device, the method comprising: connecting the client device to the image forming apparatus by a user of the client device; selecting a display item to be displayed on the client device from among a plurality of display items provided by the image forming apparatus; wherein the display item is automatically selected according to a default setting and the selected display item contains information about at least one component of the image forming apparatus; and displaying, on the client device, an executing window corresponding to the selected display item from among a plurality of executing windows respectively corresponding to the plurality of display items and stored in the web server, wherein the executing window is displayed using a web page on the client device, the web page being generated to include the executing window by the web server and transmitted to the client device; wherein the executing window display using a web page on the client device allows for the user to add a web widget corresponding to a selected display item from the plurality of display items to the executing window and to remove a web widget corresponding to a previously selected display item displayed in the executing window.

2. The method as claimed in claim 1, further comprising:
storing list information on the executing window corresponding to the selected display item in the client device, the image forming apparatus, and/or a server that is distinct from the client device and the image forming apparatus.

3. The method as claimed in claim 2, wherein the storing of the list information comprises storing a plurality of list information respectively corresponding to a plurality of users.

4. The method as claimed in claim 2, further comprising:
updating the list information to include information on another executing window corresponding to another display item in response to the user selecting the other display item.

5. The method as claimed in claim 2, wherein displaying of the executing window comprises:
requesting and receiving, by the client device, information on the executing window corresponding to the selected display item and firmware information of the image forming apparatus;
generating the executing window based on the information on the executing window and the firmware information; and displaying the generated executing window.

6. The method as claimed in claim 1, further comprising, in response to a request to change information on the image forming apparatus through the executing window, changing firmware of the image forming apparatus according to the request.

7. The method as claimed in claim 1, wherein the displaying of the executing window comprises displaying a plurality of executing windows respectively corresponding to each display item of a plurality of image forming apparatuses.

8. The method as claimed in claim 1, wherein:
the selecting of the display item comprises selecting a plurality of display items for the image forming apparatus; and
the displaying of the executing window comprises displaying a plurality of executing windows respectively corresponding to the plurality of requested display items.

9. The method as claimed in claim 1, wherein the displaying of the executing window comprises: in response to a change of information on the selected display item, changing the executing window according to the changed information; and displaying the changed executing window.

10. The method as claimed in claim 1, wherein each of the plurality of executing windows is independently operable with respect to each other.

11. The method as claimed in claim 1, wherein the selecting of the display item comprises:
receiving list information including information used to execute at least one executing window respectively corresponding to at least one display item; and
selecting the display item from among the at least one display item of the received list information.

12. The method as claimed in claim 3, wherein the displaying of the display item comprises:
authorizing the user;
receiving, from the image forming apparatus or the server, the list information corresponding to the user in response to the authorizing of the user or a default list information if a corresponding list information is not stored for the authorized user; and
displaying the executing window on the client device according to the received list information.

13. The method as claimed in claim 3, wherein the storing of the list information corresponding to the user comprises automatically updating the list information to include information on one or more executing windows according to a printing history of the user.

14. An image forming apparatus connected to a client device, the image forming apparatus comprising: a communication unit to communicate data with the client device; and a web server comprising: a storage unit to store data on a plurality of executing windows respectively corresponding to a plurality of display items of the image forming apparatus, and a web server controller to control, in response to a request by a user for a display item to be displayed on the client device from among the plurality of display items through the communication unit, wherein the display item is automatically selected according to a default setting and the selected display item contains information about at least one component of the image forming apparatus, the communication unit to transmit data on an executing window corresponding to the requested display item to the client device, wherein the executing window is displayed using a web page on the client device, the web page being generated to include the executing window by the web server controller and transmitted to the client device; wherein the executing window display using a web page on the client device allows for the user to add a web widget corresponding to a selected display item from the plurality of display items to the executing window and to remove a web widget corresponding to a previously selected display item displayed in the executing window.

15. The apparatus as claimed in claim 14, wherein the storage unit stores list information on the executing window corresponding to the requested display item.

16. The apparatus as claimed in claim 15, wherein, in response to a change to the requested display item, the web server updates the list information according to the changed display item.

17. The apparatus as claimed in claim 15, wherein the web server controller authorizes the user, and controls the communication unit to transmit the list information corresponding to the authorized user to the client device.

18. The apparatus as claimed in claim 14, further comprising:
an information changing unit to change information on the image forming apparatus,
wherein the web server controller controls, in response to a request to change the information on the image forming apparatus through the communication unit, the information changing unit to change the information on the image forming apparatus according to the request.

19. A client device connected to an image forming apparatus, said image forming apparatus having an embedded web server, the client device comprising: a network connection unit connected to the image forming apparatus having the embedded web server; a selection unit to select a display item from among a plurality of items provided by the image forming apparatus; wherein the display item is automatically selected according to a default setting and the selected display item contains information about at least one component of the image forming apparatus; and a client controller to control the network connection unit to receive data on an executing window corresponding to the selected display item, and to control a display unit to display the received executing window, wherein the executing window is displayed using a web page on the client device, the web page being generated to include the executing window by the web server and transmitted to the client device; wherein the executing window display using a web page on the client device allows for the user to add a web widget corresponding to a selected display item from the plurality of display items to the executing window and to remove a web widget corresponding to a previously selected display item displayed in the executing window.

20. The client device as claimed in claim 19, wherein the client controller controls the selection unit to select the display item according to preset information.

21. The client device as claimed in claim 19, wherein the client controller controls the display unit to display a plurality of executing windows corresponding to a plurality of display items of the image forming apparatuses.

22. An image forming system comprising: an image forming apparatus comprising an embedded web server storing data on a plurality of executing windows respectively corresponding to a plurality of display items of the image forming apparatus; wherein the display item is automatically selected according to a default setting and the plurality of display items contains information about at least one component of the image forming apparatus; and a client device connected to the image forming apparatus, the client device comprising: a network connection unit connected to the image forming apparatus, a selection unit to select a display item from among the plurality of display items provided by the image forming apparatus, and a client controller to control the network connection unit to receive data, from the web server, on an executing window corresponding to the selected display item, and to control a display unit to display the received executing window, wherein the executing window is displayed using a web page on the client device, the web page being generated to include the executing window by the web server and transmitted to the client device; wherein the executing window display using a web page on the client device allows for the user to add a web widget corresponding to a selected display item from the plurality of display items to the executing window and to remove a web widget corresponding to a previously selected display items displayed in the executing window.

* * * * *